(12) United States Patent
Petroff

(10) Patent No.: US 8,215,183 B2
(45) Date of Patent: Jul. 10, 2012

(54) AUGMENTED SURFACE SENSOR FOR MEASURING FLOW VELOCITY

(75) Inventor: Alan M. Petroff, Huntsville, AL (US)

(73) Assignee: ADS LLC, Huntsville, AL (US)

( * ) Notice: Subject to any disclaimer, the term of this patent is extended or adjusted under 35 U.S.C. 154(b) by 89 days.

(21) Appl. No.: 12/824,177

(22) Filed: Jun. 26, 2010

(65) Prior Publication Data

US 2011/0000311 A1 Jan. 6, 2011

Related U.S. Application Data

(60) Provisional application No. 61/222,997, filed on Jul. 3, 2009, provisional application No. 61/319,847, filed on Mar. 31, 2010.

(51) Int. Cl.
 *G01F 1/66* (2006.01)
(52) U.S. Cl. .................................................. 73/861.28
(58) Field of Classification Search ... 73/861.25–861.28
 See application file for complete search history.

(56) References Cited

U.S. PATENT DOCUMENTS

| | | | |
|---|---|---|---|
| 3,640,271 A | 2/1972 | Horton | |
| 4,083,246 A | 4/1978 | Marsh | |
| 4,116,061 A | 9/1978 | Petroff | |
| 4,295,197 A | 10/1981 | Petroff | |
| 4,344,329 A | 8/1982 | Petroff | |
| 4,386,409 A | 5/1983 | Petroff | |
| 4,396,943 A | 8/1983 | Lord et al. | |
| 4,397,191 A | 8/1983 | Forden | |
| 4,407,158 A | 10/1983 | Petroff | |
| 4,476,874 A * | 10/1984 | Taenzer et al. | 600/441 |
| 4,630,474 A | 12/1986 | Petroff | |
| 5,020,374 A | 6/1991 | Petroff et al. | |
| H1132 H | 1/1993 | Hellyar et al. | |
| 5,198,989 A | 3/1993 | Petroff | |
| 5,208,785 A | 5/1993 | Brumley et al. | |
| 5,226,328 A | 7/1993 | Petroff et al. | |
| 5,315,880 A | 5/1994 | Bailey | |
| 5,333,044 A | 7/1994 | Shaffer | |
| 5,333,508 A * | 8/1994 | Petroff et al. | 73/861.25 |
| 5,333,614 A | 8/1994 | Feiring | |
| 5,371,686 A | 12/1994 | Nabity et al. | |
| 5,421,211 A * | 6/1995 | Heckman | 73/861.25 |
| 5,467,650 A | 11/1995 | Cushing | |
| 5,473,948 A | 12/1995 | Moss et al. | |
| 5,483,499 A | 1/1996 | Brumley et al. | |
| 5,594,169 A * | 1/1997 | Field et al. | 73/504.14 |
| 5,615,173 A | 3/1997 | Brumley et al. | |
| 5,633,809 A | 5/1997 | Wissenbach et al. | |

(Continued)

OTHER PUBLICATIONS

Jiwani, Riyaz; Lucas, Steffen; "Methods of Flow Measurement," NIVUS GmbH, Feb. 2, 2002, p. 36-42.

(Continued)

*Primary Examiner* — Jewel V Thompson
(74) *Attorney, Agent, or Firm* — James Richards

(57) ABSTRACT

A system and method for measurement of flow parameters in a sewer pipe that may be partially or completely filled. Flow parameters may include flow velocity, flow volume, depth of flow and surcharge pressure. Measurements are taken from a sensor head installed on the inside of the pipe at the top of the pipe approximately the larger of at least 1 foot or 1 pipe diameter upstream of a pipe opening. Flow velocity may be measured by two different technologies. The technology employed depends on whether or not the pipe is full. If the pipe is not full then flow velocity may be measured, for example, using a wide beam, ultrasonic, diagonally downward looking Doppler signal that interacts with the surface of the flow. If the pipe is full, then flow velocity may be measured using, for example, an average velocity Doppler sensor, a peak velocity Doppler sensor or an ultrasonic velocity profiler.

23 Claims, 10 Drawing Sheets

U.S. PATENT DOCUMENTS

| | | | |
|---|---|---|---|
| RE35,535 E | 6/1997 | Brumley et al. | |
| 5,684,250 A | 11/1997 | Marsh | |
| 5,811,688 A | 9/1998 | Marsh et al. | |
| 5,821,427 A | 10/1998 | Byrd | |
| 6,502,465 B1 | 1/2003 | Vedapuri et al. | |
| 6,647,804 B1 * | 11/2003 | Deines | 73/861.18 |
| 7,165,014 B2 | 1/2007 | Kaneda et al. | |
| 7,672,797 B2 | 3/2010 | Petroff | |
| 2008/0163700 A1 | 7/2008 | Huang | |
| 2009/0229375 A1 | 9/2009 | Atkinson et al. | |

OTHER PUBLICATIONS

ISO 748:2007, "Hydrometry—Measurement of liquid flow in open channels using current-meters or floats", International Organization for Standarization, Oct. 15, 2007, Section 7.1.

Liu, A cusotom-Designed Ultrasound Echo Particle Image Velocimetry System: Initial Experiments, Sep. 14, 2006 [retrieved on May 18, 2011] Retrieved from URL: HTTP://www.isud-conference.orgloroc/split/isud-05 Liu.pdf> pp. 28-30.

Jones, Enhanced Resolution Doppler by Multiple Receivers, Dec. 2002[Retrieved on May 18, 2011] Retrieved from the internet URL:http://www2.1atech.edu/-sajones/Researcch/Multiple%20Receiver%20Papa%20Formatted.pdf.

Mao, Acoustic Techniques for Temperature and Flow Velocity Measurements. Dec. 2005 [retrieved on May 18, 2011] Retrieved from internet URL: http://Alexandria.tue.nl/extra2/200513071.pdf.

Young, Lee W. PCT International Search Report for PCT/US 11/30265, Filed Mar. 29, 2011, Applicant: Petroff, Alan M.; Search report mailed Jun. 2, 2011, ISA/US.

* cited by examiner

AUGMENTED SURFACE SENSOR FOR MEASURING FLOW VELOCITY

RELATED APPLICATIONS

This application is an application claiming the benefit under 35 USC 119(e) of prior U.S. Provisional Application 61/222,997, titled "Open Channel Meter for Measuring Velocity", filed Jul. 3, 2009 by Petroff, and U.S. Provisional Application 61/319,847, titled "Open Channel Meter for Measuring Velocity", filed Mar. 31, 2010 by Petroff et al., both of which are hereby incorporated herein by reference in their entirety.

BACKGROUND

1. Field of the Invention

The present invention pertains generally to the field of measurement of water flowing in partially and completely full pipes using a sensor that is not in contact with the flow, more particularly, to the class of devices that utilize ultrasonic energy to determine the channel velocity.

2. Background of the Invention

There are many cases where it is important to measure the rate of flow in a pipe. For example, one may need to know the flow rate to determine a billing rate between two communities, to assess the rate at which rain or ground water is entering the sewage system, to design a system expansion, or to control the rate at which a holding tank is filled or emptied. In measuring such flows there are periods when the conduit may be empty of fluid, partially full or completely full. The flow may be free flowing (propelled only by the force of gravity). It may be constrained by an obstruction or other such downstream constraint. It may be flowing downstream due to an upstream pressure head, or it maybe be flowing upstream (in a reverse direction) owing to a downstream pressure head.

There is a class of flow meters that rely on primary devices. These systems require either a) the construction of flumes, weirs or other structures in the manhole or b) the installation and proper alignment of these structures in the manhole. While this is a reasonable approach to consider for sewage treatment plants where existing piping systems and structures can be designed and built around the needs of the primary device, it is typically impractical, expensive or simply not possible to properly install such structures in the sewer collection system where the monitoring point in question is deep underground.

Another class of meters utilizes an underwater velocity sensor and depth sensor installed in a pipe. The depth sensor can be installed above the flow or in the flow with the velocity sensor. Examples of this class include Petroff U.S. Pat. No. 5,020,374, Petroff U.S. Pat. No. 5,333,508, Nabity et al, U.S. Pat. No. 5,371,686, Petroff U.S. Pat. No. 7,672,797. Also Marsh U.S. Pat. No. 4,083,246 and Cushing U.S. Pat. No. 5,467,650.

A third class of devices uses a downward looking velocity sensor and a downward looking ultrasonic depth sensor to measure flow in the manhole (Marsh U.S. Pat. Nos. 5,684,250 and 5,811,688) or as it enters the manhole or over a flume (Bailey U.S. Pat. No. 5,315,880). The primary advantage of this approach being that it minimizes entry into confined space.

Accordingly, there is a need for a flow meter that measures depth and velocity with improved accuracy. All of the above referenced patent documents are incorporated herein by reference.

BRIEF DESCRIPTION OF THE INVENTION

The present invention relates to a system and method for measurement of flow parameters in a sewer pipe that may be partially or completely filled. Flow parameters may include flow velocity, flow volume, depth of flow and surcharge pressure. Measurements are taken from a sensor head installed on the inside of the pipe at the top of the pipe approximately the larger of at least 1 foot or 1 pipe diameter upstream of a pipe opening. Flow velocity may be measured by two different technologies. The technology employed depends on whether or not the pipe is full. If the pipe is not full then flow velocity may be measured, for example, using a wide beam, ultrasonic, diagonally downward looking, Doppler signal that interacts with the surface of the flow. If the pipe is full, then flow velocity may be measured using, for example, an average velocity Doppler sensor, a peak velocity Doppler sensor or an ultrasonic velocity profiler. The system is configured with a compact sensor head installed within the upstream interior of an influent pipe, upstream of the pipe entrance into the manhole, and thus well upstream of any hydraulic drawdown phenomenon. The system includes a separate electronics package remotely located out of the flow volume. The downward looking air ultrasound sensor determines a peak surface flow velocity based on the distribution of measured velocities.

The depth of flow can be measured with any of a variety of technologies including, for example, a pressure sensor mounted in the flow, a mechanical float, a downward looking ultrasonic ranger installed at the top of the pipe, and upward looking ultrasonic sensor installed in the flow, a capacitance meter, etc. The depth and velocity sensors are typically installed in the influent pipe using a ring and crank assembly. With the knowledge of the pipe geometry, the depth of flow can be converted into a cross-sectional areas. Multiplying this area by the velocity yields a measure of the flow rate.

In one embodiment, the system measures the velocity of water using a diagonally downward looking Doppler velocity sensor. The sensor is installed by entering the sewer manhole and installing the sensor at the top of the inside the influent pipe such that it is pointed upstream in the direction of the flow. The pipe should be inspected to ensure that the pipe has a continuous uniform cross section, is straight for at least ten, preferably twenty pipe diameters, and is free of cracks or fissures as would cause unexpected flow disturbance. The location of the measurement is beneficial in that this point represents the point most likely to have stable hydraulics. Monitoring velocity at the discharge point into the manhole, in the manhole itself, in the discharge point from the manhole or in the discharge pipe is worse than ill advised as these points do not have stable hydraulics. In accordance with this invention, the sensor transmits and receives ultrasonic reflections from the surface of the water such that at least some of the returned energy reflects from the surface of the water and thereby experiences a Doppler shift. An analog to digital converter then converts the received signal into a stream of digital information. A microprocessor filters and then spectrally processes the data, typically by a Fourier process, and generates a frequency domain data set. An algorithm then searches through the spectrum of the Doppler energy content for the peak Doppler shift. This peak Doppler shift being representative of the peak surface velocity. The average velocity is then obtained by multiplying the peak Doppler shift by a factor, for example, 0.90. The factor is used to relate the flow as determined according to the ultrasonic observation procedure to the total flow in the pipe as represented by an average velocity. The factor may be selected depending on pipe size, shape, slope, roughness, depth of flow, and the flow rate itself.

The present invention is particularly well adapted for measuring flows in small pipes, typically less than or equal to 24 inches in diameter. Small pipes are pipes that are small relative to the man hole access chamber potentially causing a change in flow grade or flow geometry as the flow transitions from the influent pipe to the man hole and back again to the exit pipe. The sensor assembly is adapted to measure steady state flow in the pipe, without disturbing the flow, and is preferably positioned upstream from the opening of the pipe, away from flow disturbances caused by the pipe opening into the man hole space.

As a further benefit, the small size of the sensor head and the separate remotely located electronics package further allow the sensor to be mounted inside small pipes with minimal effect on the flow.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention is particularly well adapted for measuring flows in small pipes, typically less than or equal to 24 inches in diameter. Small pipes are pipes that are small relative to the man hole access chamber potentially causing a change in flow grade or flow geometry as the flow transitions from the influent pipe to the man hole and back again to the exit pipe. The sensor assembly is adapted to measure steady state flow in the pipe, without disturbing the flow, and is preferably positioned upstream from the opening of the pipe, away from flow disturbances caused by the pipe opening into the man hole space.

Fast shallow flows potentially present challenges for accurate measurement. Fast flows around a sensor produce a Bernoulli effect that causes pressure/level sensors to read incorrectly. Fast flows over the sensor cause hydraulic jumps. These jumps increase the depth directly over the sensor (where depth is measured), but not in front of the sensor (where the velocity is measured). Computing the flow rate based on a depth at one flow regime and a velocity at a different flow regime will result in an inaccurate measurement. Furthermore, independent of the velocity of the flow, any sensor in the flow is subject to fouling and general wear and tear.

In one embodiment, the present invention utilizes an air acoustic ultrasonic velocity sensor mounted at the top of the pipe for sensing velocity when the pipe is partially filled and, in combination, uses an underwater acoustic ultrasonic velocity sensor when the pipe is full or nearly full, In one embodiment, the depth of fill is determined and the appropriate sensor is then activated to measure flow. The depth of fill may be determined by a pressure sensor or by a vertically directed ultrasound distance measurement device. In an alternative embodiment, the air ultrasound and water ultrasound devices may be operated simultaneously or alternately, providing substantially concurrent velocity readings. The velocity readings may be evaluated for signal or measurement quality, for example, for signal to noise and for measurement to measurement variance to determine which source is the most reliable. The output of the most reliable source is then reported as the measured velocity. In a further alternative, all measurements of all sensors are recorded and reported for later analysis. A data processing center may do the final analysis to combine or select sensors to determine the flow rate.

Figure 1:
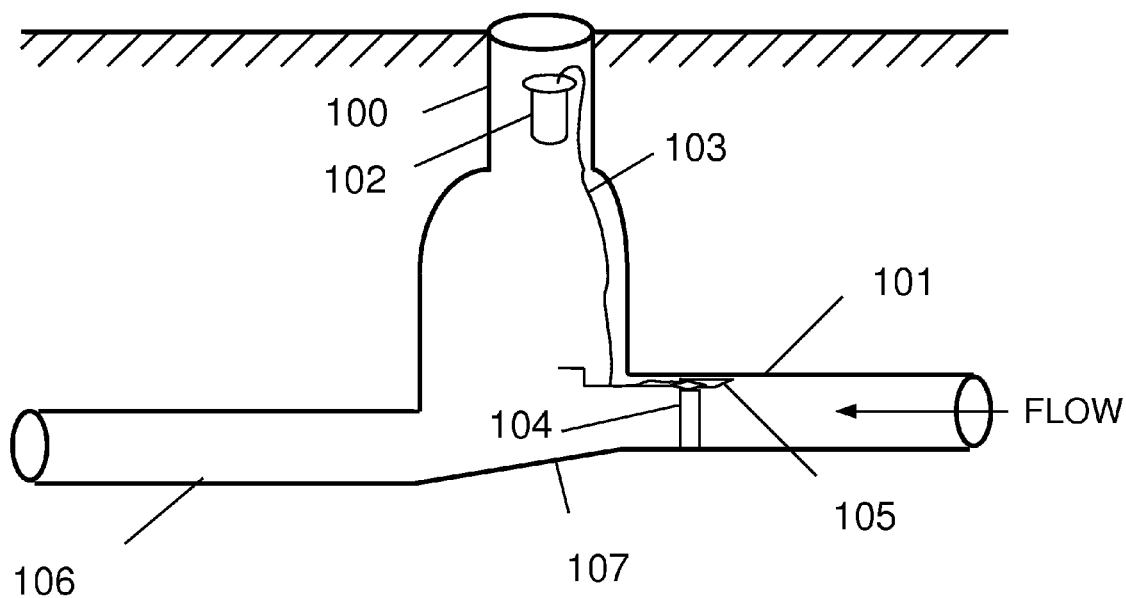
FIG. 1 is an exemplary drawing of a typical installation of a flow measuring device in accordance with the present invention.

FIG. 1 is an exemplary drawing of a typical installation of a flow measuring device in accordance with the present invention. FIG. 1 illustrates a typical manhole 100 with the sensor 102,105 installed. The manhole comprises a wall forming an access chamber on top of a base. Water flows from the influent pipe 101 through the manhole access chamber and out through the effluent pipe 106. The floor of the access chamber has a trough or channel 107 formed below the floor (also termed "bench") The trough, also referred to as an "invert" 107 typically matches the pipe width and often the depth, but is open at the top to allow access to the pipe. The slope of the flow through the manhole is typically greater than the slope of the pipe, thus creating a discontinuity in flow as water passes through the manhole.

Turning, now, specifically to FIG. 1, a transmitting and receiving ultrasonic sensor 105 is mounted on an expandable scissors jack mounting ring 104 and is installed in the influent pipe 101 of manhole 100. The scissors jack mounting, as described in Petroff U.S. Pat. No. 4,116,061, is ideal for installation in smaller diameter pipes. U.S. Pat. No. 4,116,061, titled "Sewer Line Analyzer Probe," issued Sep. 26, 1978 to Petroff is hereby incorporated herein by reference. In the arrangement of FIG. 1, the sensor is preferably positioned at the top of the pipe approximately 1 foot or 1 pipe diameter upstream of the manhole such that it is "looking" up stream. In larger diameter pipes, the ring may not be practical. In such cases, the sensor could be mounted on a simple band of aluminum and fastened to the wall using anchor bolts. While the sensor could be installed either in the influent pipe 101 or the effluent pipe 106 or even in the manhole invert 107, the hydraulic flow conditions in the influent pipe are almost always far superior and lend themselves to more accurate flow readings. Sensor 105 is connected through cable 103 to a water proof signal processor/data logger 102 that contains the signal processing, data logging, communications electronics, power supplies and batteries.

Figure 2A:
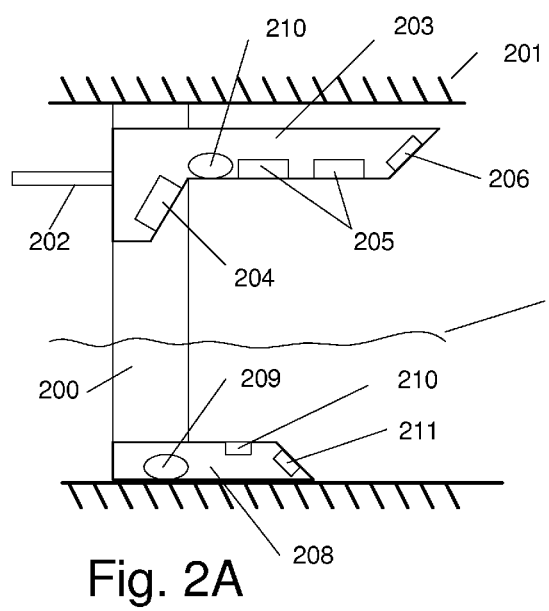
FIG. 2A and FIG. 2B are exemplary drawings illustrating the sensor head and ring and crank assembly in position in the influent pipe.
Figure 2B:
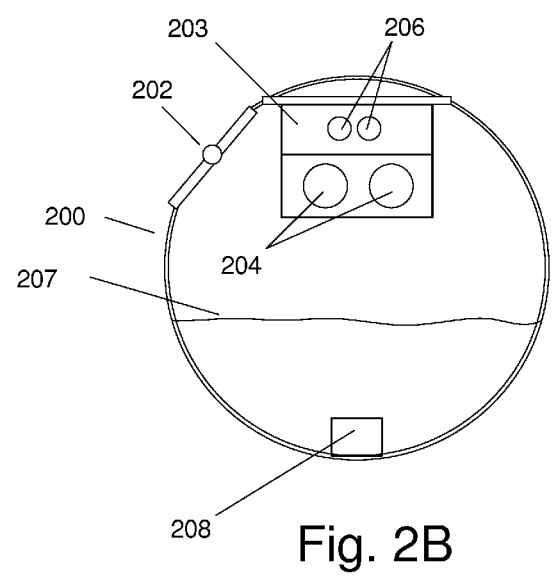

FIG. 2A and FIG. 2B illustrate an exemplary sensor head 203 mounted on an exemplary ring/crank assembly 202 installed in pipe 201. Sensor head 203 contains ultrasonic range sensors 205 for measuring distance to the surface of the water 207, surface velocity ultrasonic transmit and receive sensor pair 204 for measuring water surface velocity, pressure sensor 210 for measuring static pressure when the pipe is full or under pressure, ultrasonic velocity sensors 206 for measuring velocity when the pipe is full. It should be noted that ultrasonic velocity sensors 206 can be of many different types including but not limited to average velocity Doppler, peak velocity Doppler or velocity profiler. An exemplary velocity profiler is disclosed in Application 61/319,847, titled: "Open Channel Meter for Measuring Velocity", filed Mar. 31, 2010 by Petroff et al., which is incorporated herein by reference.

It is possible to add an optional sensor 208 to the ring. Such a sensor could redundantly measure water pressure with pressure sensor 209, depth with ultrasonic ranging sensor 210 and velocity with sensor 211.

In one embodiment, the underwater velocity sensor is sensor 206 at the top of the pipe, potentially in the same sensor head 203 as the air ultrasonic sensor 204. Alternatively, or in combination with sensor 206, the underwater sensor may be sensor 211 positioned at the bottom of the pipe.

Figure 3:
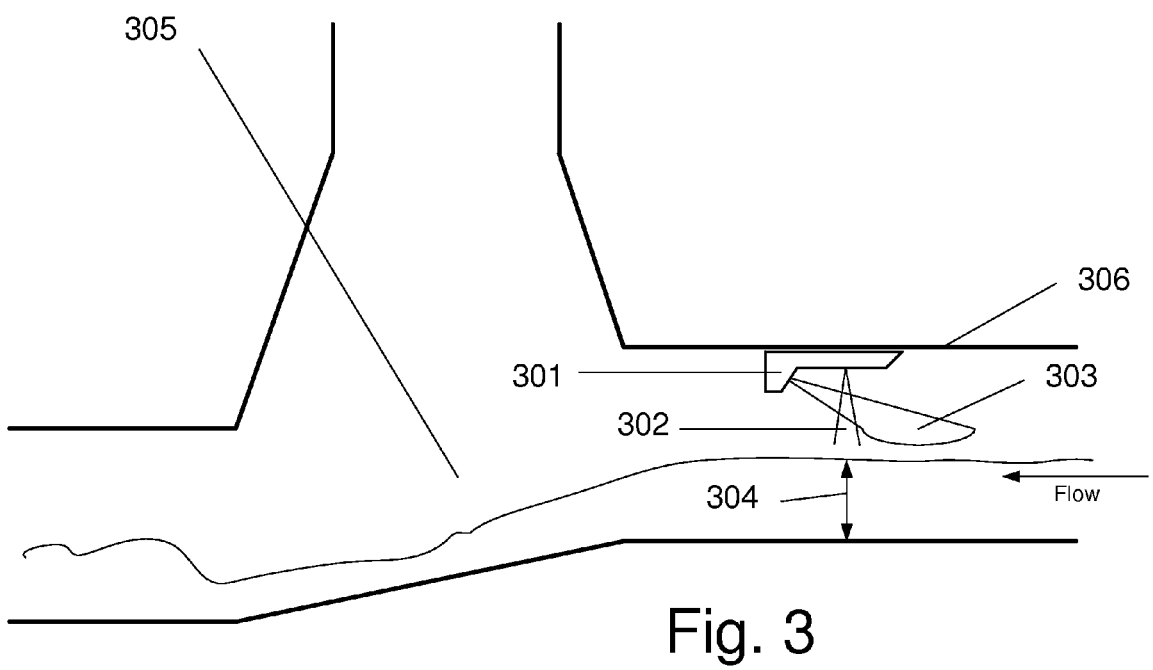
FIG. 3 is an exemplary profile drawing of a typical sensor showing the sensor installation point, the sensor field of view and the water flow profile.

FIG. 3 illustrates an exemplary installed location of sensor head 301 in the influent pipe 306 of manhole 305 as well as the field of view of the depth 302 and surface velocity 303 ultrasonic transceivers relative to the depth of flow 304 in pipe 306. Note that water surface drops as it enters manhole 305, reaches a minimum in the middle of the manhole and then experiences a hydraulic jump as it exits manhole.

Figure 4:
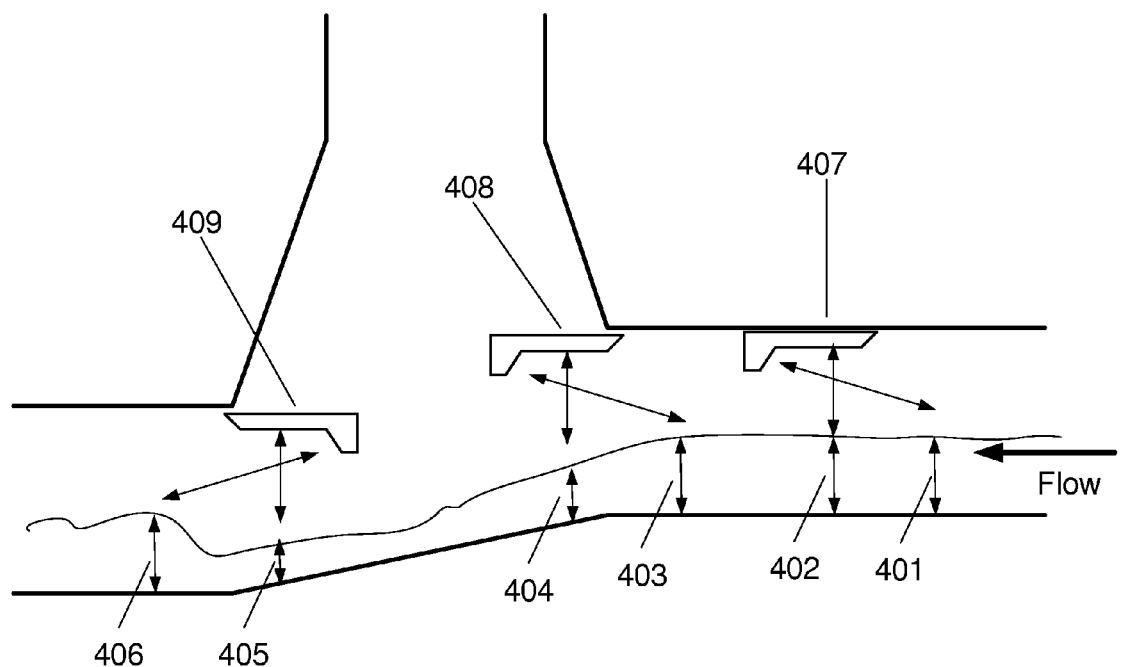
FIG. 4 is an exemplary drawing illustrating the benefits of an improved sensor location.

FIG. 4 illustrates the benefits of the installation location. Owing to the respective sensor fields of view, the sensor installed at location 407 will measure the depth at location 402 and the velocity location 401. Since the depth at 401 is the same as the depth at location 402, the velocity at 401 is identical to the velocity at 402. Consequently it is possible to compute the flow rate based on the velocity at 401 and the depth at 402. This is not the case for sensors installed at locations 408 and 409. In location 408, the velocity accelerates as it enters the manhole such that the velocity at 404 is higher and the depth more shallow than at 403. Therefore computing a flow rate based on the depth at 404 and the velocity at 403 will result in a significant overstatement of the flow rate. Similarly, the flow at 406 is deeper and slower than the flow at location 405. Therefore, computing a flow at location 409 based on the depth at 405 and the velocity at 406 will result in a significant understatement of the flow rate. This effect is characteristic of small pipes, typical in midsized pipes and less common in very large pipes.

Figure 5:
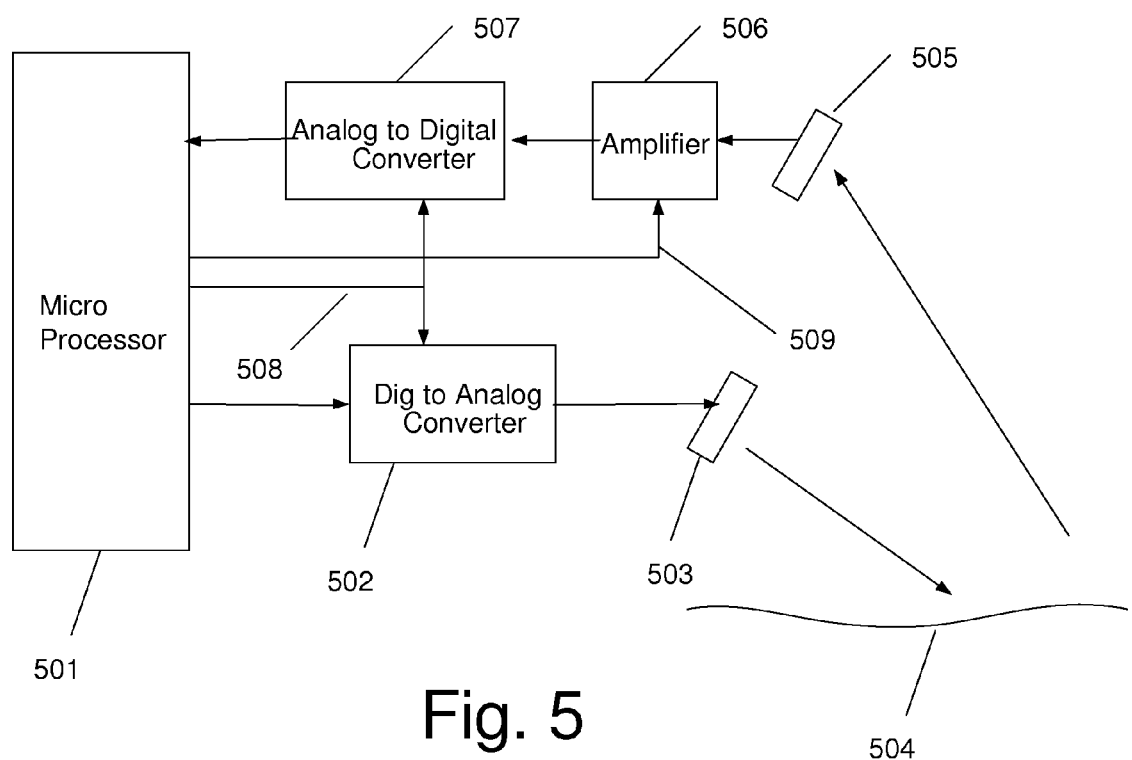
FIG. 5 is an exemplary block diagram of the electronics.

FIG. 5 is an exemplary block diagram of the sensor system illustrating the electronic aspects of the invention. Microprocessor 501 sends a synchronization signal to both the digital to analog converter 502 and to analog to digital converter 507 as well as a data stream to the analog to digital converter. The synchronization signal insures that all signal processing is handled coherently. The data stream is converted into a time variant analog voltage by digital to analog converter 502 whose output excites ultrasonic transmit sensor 503. Note that the amplitude and characteristics of the transmitted signal (such as center frequency or signal magnitude as a function of time) can be controlled simply by controlling the data stream sent by the microprocessor. Sound is transmitted by transmit sensor 503 at an angle of approximately 30-60 degrees from the surface of the water such that it reflect off of water surface 504. When the signal reflects it will experience a Doppler shift, and at least some of the reflected energy will be received by ultrasonic receiver 505. This weak signal will be amplified by variable amplifier 506. The processor can control the amount of amplification through control lines 509. The amplified signal is then digitized by analog to digital converter 507 and stored by microprocessor 501.

Figure 6:
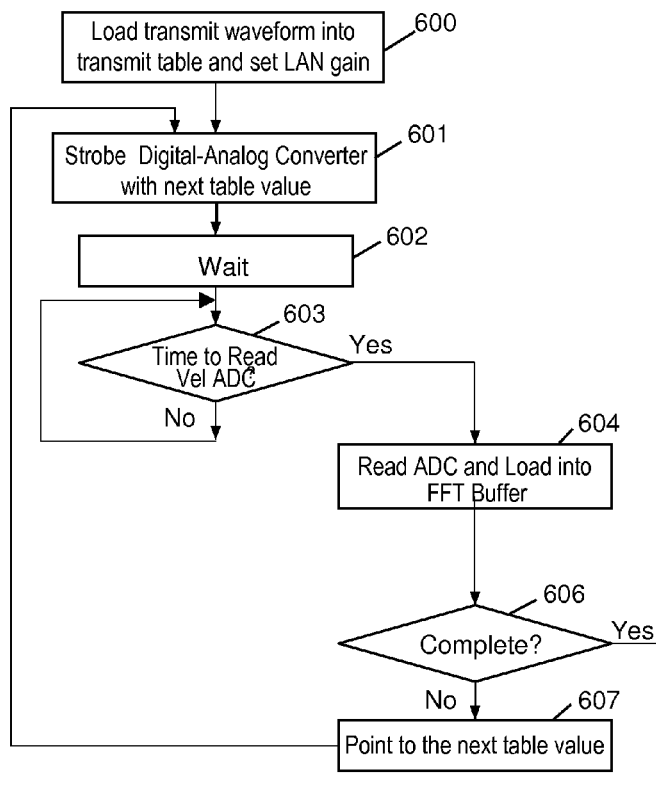
FIG. 6 is an exemplary flow chart that describes the signal processing.
Figure 6:
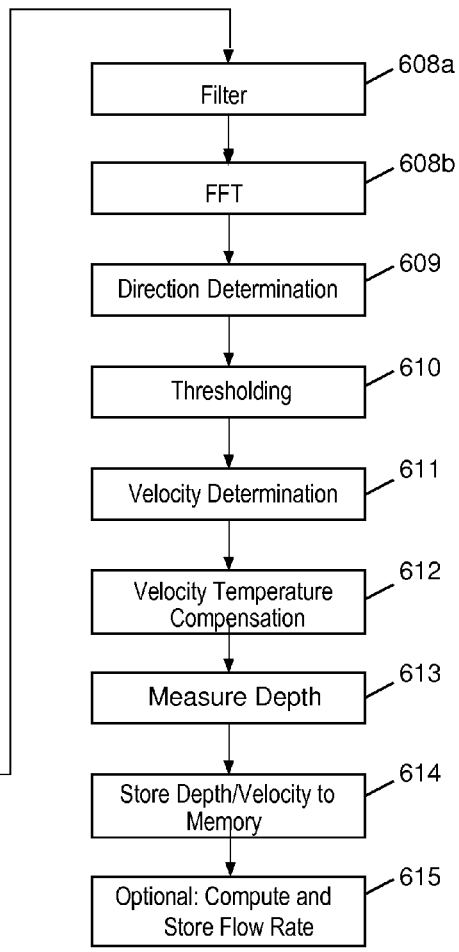

FIG. 6 is an exemplary flow chart illustrating the signal processing. In step 600, a sequence of numbers representing the desired excitation waveform is loaded into the transmit table and the gain of amplifier 506 is set. The receive gain can be set through the following process. With the transmitter turned off, record the input from the receiver and then set the gain of the receive amplifier such that the received signal constitutes several bits of the ADC. The waveform frequency and magnitude is normally set to the resonant frequency of the crystal and the amplitude to the maximum. This insures that the maximum possible signal is transmitted. Care should be taken to insure that the maximum possible signal is not large enough to saturate the front end receiver. In step 601, the first entry in the transmit table is strobed into the Digital to Analog Converter 502. At step 603, the system waits a fixed amount of time and in step 604 reads the output of Analog to Digital Converter 507 and loads the output value into the FFT input buffer. In step 606, the system checks to see if the last table value has been sent and its corresponding ADC value has been read. If not, then step 607 sets the table pointer to the next location and operation resumes at step 601. If complete, then the received signal data will be filtered twice in block 608a. It will be filtered once to reject out of band signal and filtered a second time to reject the carrier. It is important to reject the carrier as this energy is associated either acoustic energy coupling directly through the air from the transmitter to the receiver or from energy reflecting from non-moving reflectors like the pipe wall. This energy is self jamming energy and if large enough will overflow the dynamic range of the signal processor. Since this energy is not needed and is of no value, it can be filtered out with a notch filter. This notch filter can be implemented with either an external hardware filter or through digital signal processing. In step 608b, an FFT is performed on the received data thus converting it into the frequency domain. The FFT can be performed on the entire data set or smaller FFTs can be performed and their results summed. The direction of the flow is determined in step 609. Direction is determined by comparing the amount of energy received less than the carrier frequency with the amount of energy received that is greater than the carrier frequency. The greater magnitude indicates the signal direction. In step 610 a thresholding algorithm determines the peak velocity. The basis for this operation will be explained in the discussion of FIG. 7. In step 611 the peak velocity is converted into average velocity by applying a correction factor of approximately 0.92. In step 612 the temperature of the environment is measured and the water velocity measurement is corrected for the change of the speed of sound in water as a function temperature. In step 613 the depth is measured. In step 614 the depth and velocity is stored in memory. As an option, it is also possible in step 615 to compute and store the flow rate. Flow rate is determined by multiplying the velocity measured by the cross-sectional area of the flow. That area can be computed by knowing the pipe geometry and the depth of flow.

Figure 7:
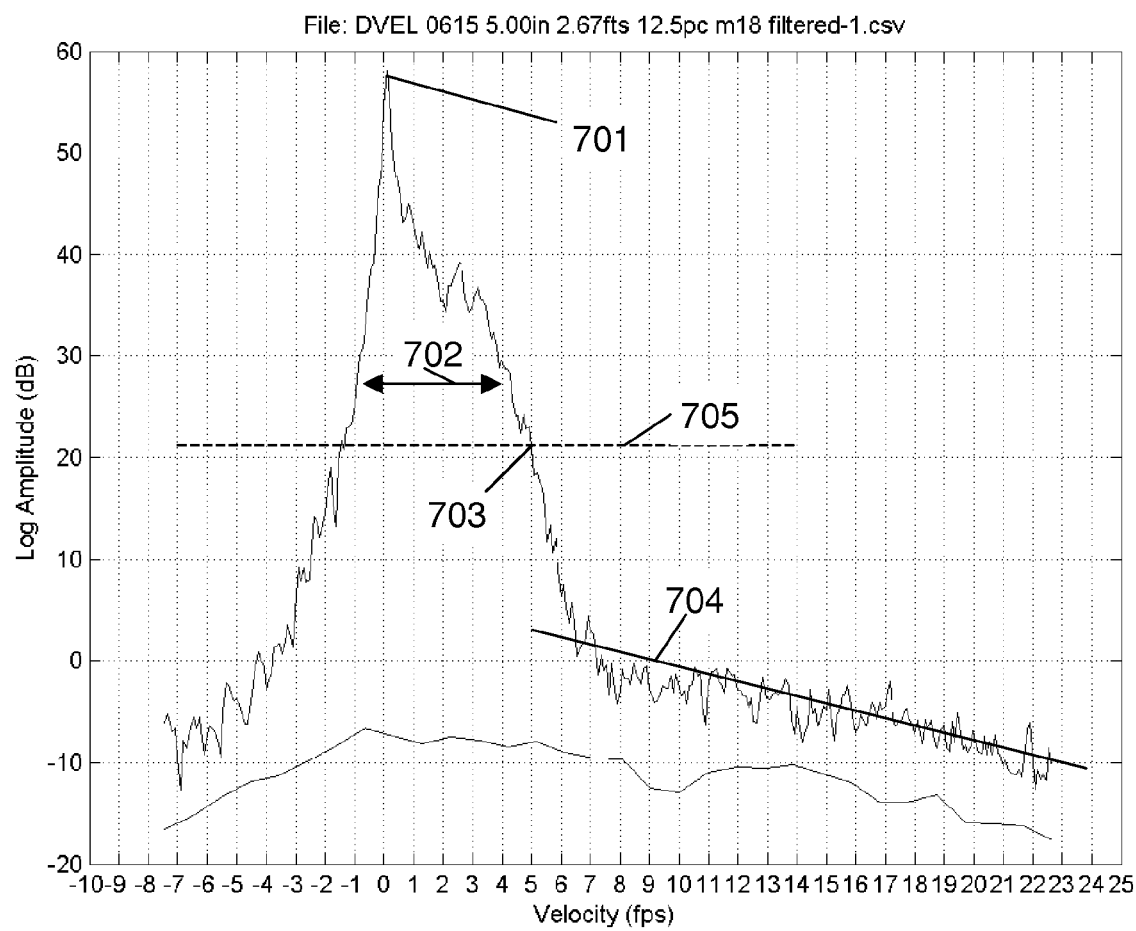
FIG. 7 is an exemplary graph of a typical captured velocity spectrum showing the key signal features.

FIG. 7 shows an exemplary captured velocity spectrum and describes the key signal features. The vertical axis shows the log of the received signal amplitude. The horizontal axis shows the velocity in ft/sec of Doppler frequency shift. The point indicated by 701 is the energy that is received either from fixed objects or is residual carrier frequency energy that was not taken out by the carrier notch filter. It can be ignored. The line indicated as 704 is the environmental and electronic noise floor. The range of velocities/Doppler shifts indicated by the arrow 702 is intended to illustrate the fact that the system will receive return energy from water surface areas moving at different velocities or, dependant on the angle of the flow to the angle of the beam, different apparent velocities. Regardless of the velocity distribution or the angle of the flow to the energy beam, there is only one peak velocity. That velocity occurs approximately at point 703. By setting threshold level 705 to 20 dB, the intersection of the threshold and the spectrum can be used as an indicator of peak surface velocity. In general, the peak Doppler shift frequency 703 is the high frequency intersection between a predefined threshold 705 and the power spectral density plot (FIG. 7) of the reflected ultrasonic signal. The predefined threshold 705 is established between the system noise floor 704 and a maximum spectral density value 701. In one embodiment the threshold 705 may be half way between the noise floor 704 and the maximum 701 on a log(dB) scale. The robustness of the peak surface velocity measurement can be improved by taking several such measurements and integrating the results.

Figure 8:
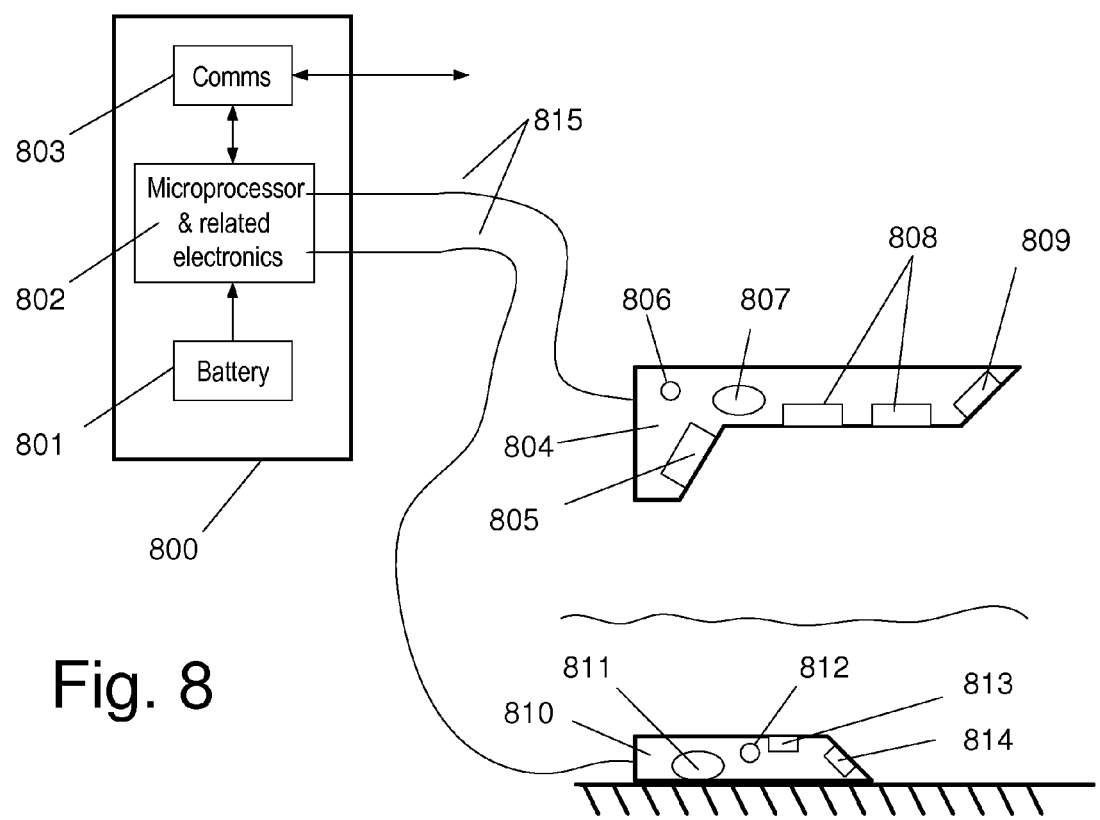
FIG. 8 is an exemplary block diagram of the system and includes the sensors, data logger and communications interface.

FIG. 8 is an exemplary block diagram of the complete system including data logger, communications interface and sensors, data logger and communications interface. More specifically data logger 800 contains the following: battery 801, electronics package 802 (power supply, microprocessor, memory and sensor interface electronics) and communications interface 803. A wide variety of communications interfaces can be supported including RS232, USB, Telephone, Bluetooth, Zigbee, GSM cell phone or 802.11. The data logger may send any or all data to a data processing facility for further processing and recording. The data logger is connected to downward sensor head 804 and optional redundant flow sensor 810. The downward sensor head contains a pair of ultrasonic surface velocity sensors 805, an air temperature sensor 806, a pressure sensor 807, a downward ranging ultrasonic sensor pair 808 and a velocity sensor 809. Optional sensor 810 is mounting in the flow and contains pressure sensor 811, water temperature sensor 812, diagonally upward looking ultrasonic range sensor 813 and ultrasonic velocity sensor 814.

Figure 9:
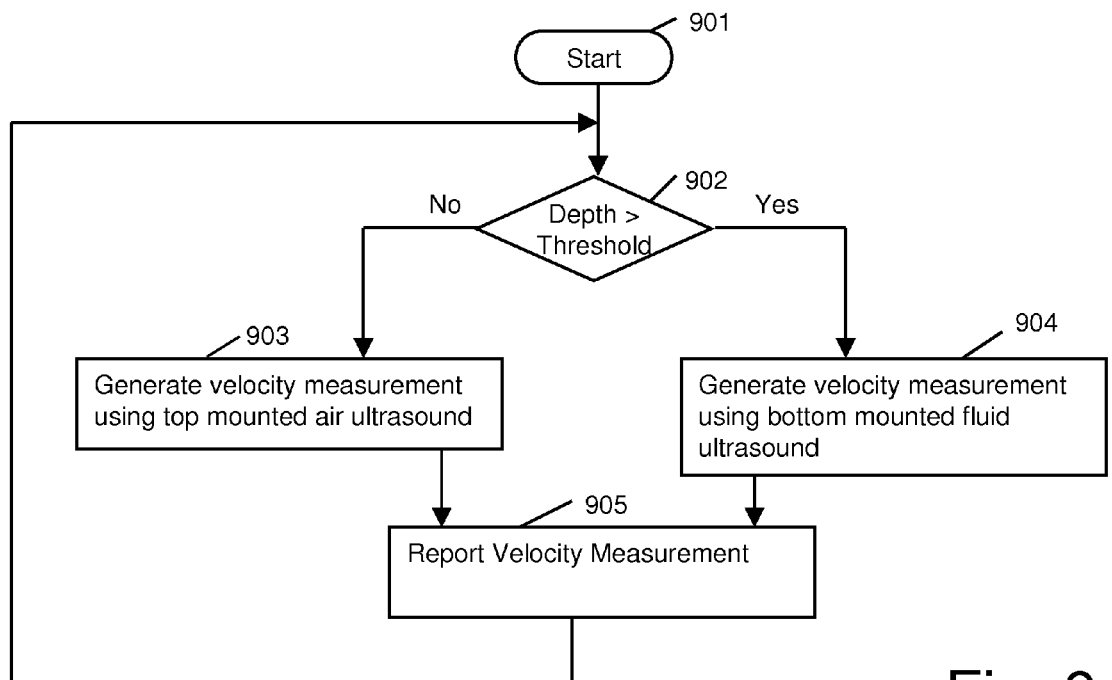
FIG. 9 is an exemplary functional flow diagram of one embodiment using a depth measurement to determine the velocity source.

FIG. 9 is a functional flow diagram of one embodiment using a depth measurement to determine the velocity source. Referring to FIG. 9, the process starts 901. A depth measurement is taken and the depth is compared with a predetermined threshold 902. Typically, if the depth is high enough to interfere with the operation of the air ultrasound sensor, the underwater sensor is selected. The depth threshold may be entered manually when the system is installed, based on the pipe size. The depth threshold may be typically from 90% to 95% of the pipe diameter. Other values may be used depending on the performance of the air ultrasound sensor. If the depth is less than the threshold, the air ultrasound sensor is operated in step 903 to determine the velocity. If the depth is greater than the threshold, the fluid ultrasound is operated in step 904 to determine the velocity. By operating only one ultrasound system at a time, interference between the ultrasound systems is prevented. The resulting velocity measurement is then reported 905.

Figure 10:
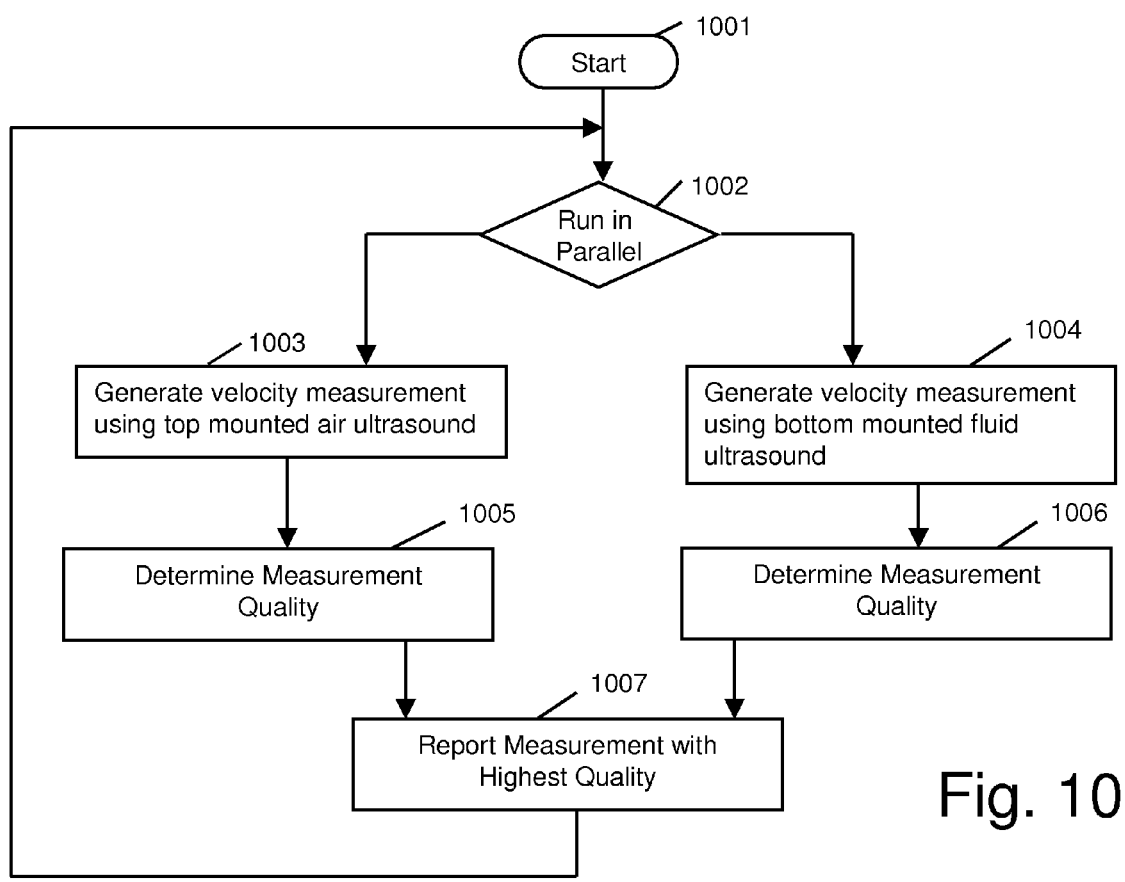
FIG. 10 is an exemplary functional flow diagram of one embodiment using a measurement quality estimate to determine the velocity source.

FIG. 10 is a functional flow diagram of one embodiment using a measurement quality estimate to determine the velocity source. Referring to FIG. 10, the process starts at 1001. The system runs both the air 1003 and fluid 1004 ultrasound velocity systems in parallel 1002. In one embodiment, the air and fluid ultrasound systems utilize different ultrasound frequencies and do not interfere and can run simultaneously. In another embodiment, the two ultrasound velocity systems are run one at a time alternately. Measurement quality is determined for the air 1005 and fluid 1006 systems. Measurement quality may be based on receiving sufficient return signal strength, or on measurement to measurement variance in velocity. In a further embodiment, a depth measurement may influence the quality determination and may even override the quality determination. For example, a depth measurement of 95% of pipe diameter may rule the air ultrasound unreliable. The resulting measurement value reported is the one returned by the system (air or fluid) having the highest quality determination 1007. For the purposes of this disclosure, fluid means liquid, typically liquid water, and does not refer to gas or air.

CONCLUSION

Thus, herein described is a flow sensor that accurately and economically measures flow velocity, including low flow and reverse flow, in a pipe over the full range of fill percentages without substantially interfering with the flow and may operate for extended periods in remote unattended locations.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A fluid flow velocity measurement system for measuring flow in an influent pipe which may become partially or fully filled with fluid, said system comprising:
   an air ultrasonic velocity measurement system, said air ultrasonic velocity measurement system for mounting at the top interior of the pipe, said air ultrasonic velocity measurement system transmitting a first ultrasonic signal and receiving a first reflected ultrasonic signal resulting from interaction with a surface of the fluid; said first reflected ultrasonic signal being processed to determine a first Doppler shift frequency related to a first flow velocity;
   said first Doppler shift frequency being the high frequency intersection between a threshold and a power spectral density plot of said first reflected ultrasonic signal; said threshold being established between a system noise floor and a maximum spectral density value.

2. The fluid flow velocity measurement system as recited in claim 1, wherein the threshold is half way between said maximum spectral density value and said system noise floor on a logarithmic scale.

3. The fluid flow velocity measurement system as recited in claim 1, wherein the threshold is 20 dB above the system noise floor.

4. The fluid flow velocity measurement system as recited in claim 1, further including a fluid ultrasonic velocity measurement system, said fluid ultrasonic velocity measurement system transmitting a second ultrasonic signal and receiving a second reflected ultrasonic signal resulting from interaction with particles within the fluid; said second reflected ultrasonic signal being processed to determine a second Doppler shift frequency related to a second flow velocity;

said air ultrasonic velocity measurement system directed to sense upstream of a location of said fluid ultrasonic measurement system to avoid flow disturbance caused by said fluid ultrasonic system;

a selection process configured to select said first flow velocity or said second flow velocity depending on a selection criterion.

5. The fluid flow velocity measurement system as recited in claim 4, further including a fluid depth measuring device for measuring the depth of said fluid, wherein said selection criterion is based on said depth of said fluid.

6. The fluid flow velocity measurement system as recited in claim 5, wherein the fluid depth measuring device is based on pressure.

7. The fluid flow velocity measurement system as recited in claim 5, wherein the fluid depth measuring device is based on ultrasonic distance measurement.

8. The fluid flow velocity measurement system as recited in claim 4, further including a measurement quality determination process for determining a quality of said first flow velocity relative to a quality of said second flow velocity; wherein said selection criterion is based on a result of said measurement quality determination process.

9. The fluid flow velocity measurement system as recited in claim 8, wherein the quality determination of the first flow velocity is based on a signal strength of said first reflected ultrasonic signal.

10. The fluid flow velocity measurement system as recited in claim 8, wherein the quality determination of said first flow velocity is based on measurement to measurement variance of said first flow velocity.

11. The fluid flow velocity measurement system as recited in claim 4, wherein the fluid ultrasonic velocity measurement system is disposed at the bottom interior of the influent pipe.

12. The fluid flow velocity measurement system as recited in claim 4, wherein the fluid ultrasonic velocity measurement system is disposed at the top interior of the influent pipe.

13. The fluid flow velocity measurement system as recited in claim 4, wherein the fluid ultrasonic velocity measurement system is based on peak velocity, average velocity, or velocity profiling.

14. A flow velocity measurement system for measuring flow in an influent pipe which may become partially or fully filled with fluid, said system comprising:

a first velocity measurement system, said first velocity measurement system for mounting at the top of the pipe, said first velocity measurement system transmitting a first signal and receiving a first reflected signal resulting from interaction with a surface of the fluid; said first reflected signal being processed to determine a first flow velocity;

a fluid ultrasonic velocity measurement system, said fluid ultrasonic velocity measurement system transmitting a second ultrasonic signal and receiving a second reflected ultrasonic signal resulting from interaction with particles within the fluid; said second reflected ultrasonic signal being processed to determine a second Doppler shift frequency related to a second flow velocity; said first velocity measurement system directed to sense upstream of a location of said fluid ultrasonic velocity measurement system to avoid flow disturbance caused by said fluid ultrasonic velocity measurement system; and a communication interface configured to report said first flow velocity and said second flow velocity to a data processing facility.

15. The fluid flow velocity measurement system as recited in claim 14, further including a selection process configured to select said first flow velocity or said second flow velocity depending on a selection criterion.

16. The fluid flow velocity measurement system as recited in claim 15, further including a fluid depth measuring device for measuring the depth of said fluid, wherein said selection criterion is based on said depth of said fluid.

17. The fluid flow velocity measurement system as recited in claim 16, wherein the fluid depth measuring device is based on pressure.

18. The fluid flow velocity measurement system as recited in claim 15, further including a measurement quality determination process for determining a quality of said first flow velocity relative to a quality of said second flow velocity; wherein said selection criterion is based on a result of said measurement quality determination process.

19. The fluid flow velocity measurement system as recited in claim 18, wherein the quality determination of the first flow velocity is based on a signal strength of said first reflected signal.

20. A method for measuring fluid flow velocity in a pipe which may become partially or completely filled with fluid, the method comprising the steps of:

providing a first velocity sensor for mounting at the top of said pipe, said first velocity sensor interacting with a surface of said fluid to determine a first flow velocity;

providing a second velocity sensor, said second velocity sensor interacting with particles or flow features at the surface or in the body of said fluid to determine a second flow velocity;

directing said first velocity sensor for sensing said fluid upstream of a location of said second velocity sensor to avoid flow disturbance caused by said second velocity sensor;

determining a selection criterion for selecting said first flow velocity or said second flow velocity; and selecting said first flow velocity or said second flow velocity based on said selection criterion.

21. A method for measuring flow rate in an influent pipe which may become partially or completely filled with fluid, the method comprising the steps of verifying a condition of said pipe as having sufficient section of straight length and uniform cross section and freedom from flow disturbances;

installing flow measuring equipment comprising a first velocity sensor;

installing said first velocity sensor at the top of said pipe and directed upstream, said first velocity sensor observing upstream of any flow disturbance introduced by the installation of said first velocity sensor; said first velocity sensor for interacting with a surface of said fluid for determining a first flow velocity.

22. The method in accordance with claim 21, wherein said flow measuring equipment further includes a second velocity sensor and a data logger, said method further including the steps of:

installing said second velocity sensor, said second velocity sensor directed upstream, said second velocity sensor interacting with reflective particles within a flow of said fluid for determining a second flow velocity;

said data logger communicating said first flow velocity and said second flow velocity to a data processing facility.

23. The method in accordance with claim 22, further including:

said data logger determining a selection criterion for selecting said first flow velocity or said second flow velocity; and said data logger selecting and reporting said first flow velocity or said second flow velocity based on said selection criterion.

* * * * *